Jan. 21, 1969 N. HIGUCHI 3,422,508
FITTING FOR CARGO TIEDOWN GEAR
Filed June 22, 1967 Sheet 2 of 2
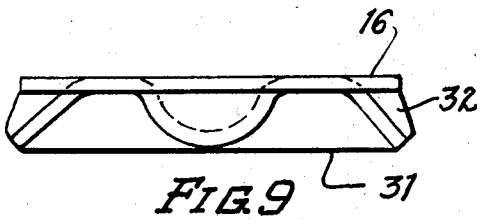
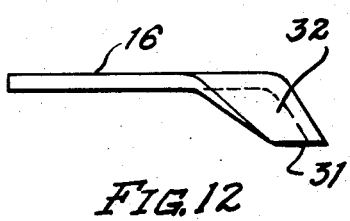
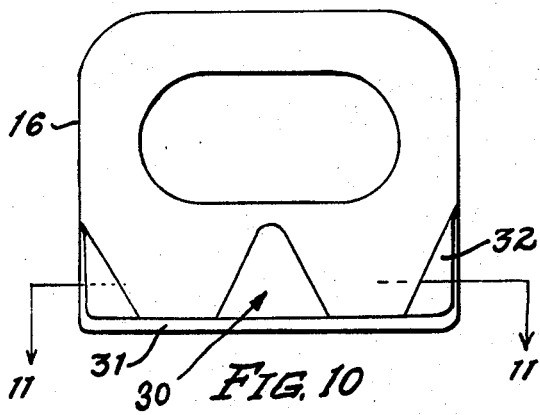
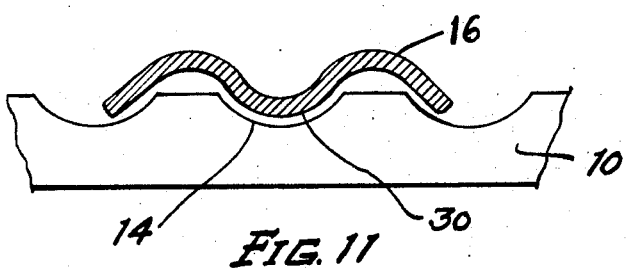
INVENTOR.
NORI HIGUCHI
BY *Philip S. McBean*
ATTORNEY.

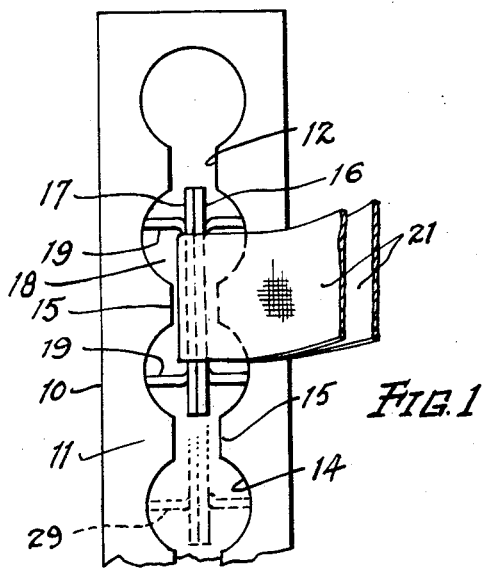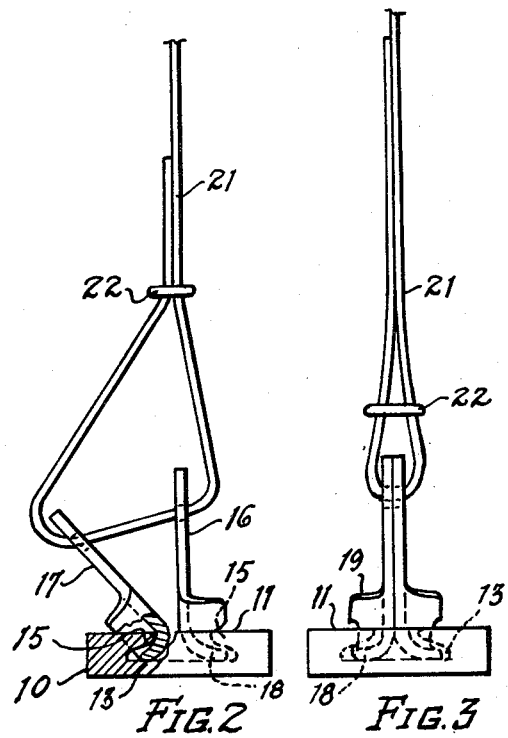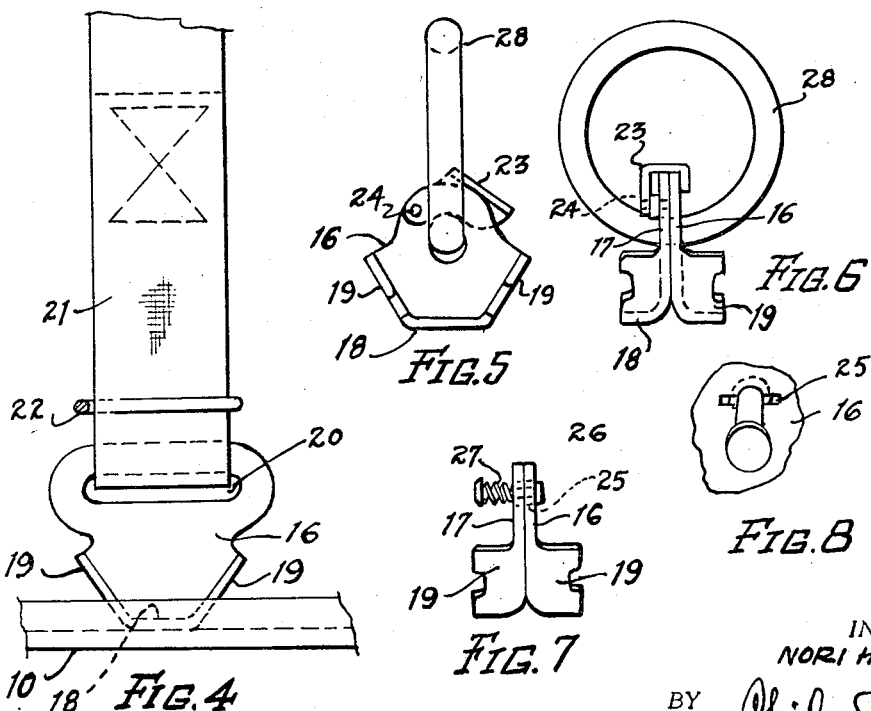

United States Patent Office 3,422,508
Patented Jan. 21, 1969

3,422,508
FITTING FOR CARGO TIEDOWN GEAR
Nori Higuchi, Northport, N.Y., assignor to Davis Aircraft Products, Inc., Northport, N.Y., a corporation of New York
Filed June 22, 1967, Ser. No. 647,988
U.S. Cl. 24—265                                    6 Claims
Int. Cl. B65j *1/22*

ABSTRACT OF THE DISCLOSURE

Cargo tiedown fitting made up of anchor plates which can be separately engaged in back-to-back relation in the channel of a cargo tiedown track and which when so engaged will be locked in place in the track.

---

The anchor plates are so constructed as to be readily engageable in the channel of the tiedown track in loosely separated condition and to interlock with portions of the track when brought together in the back-to-back relation and so held under load applied by the tiedown connection.

The objects of the invention are to provide anchorage fittings for rope, cord, cable, chain, webbing or other forms of tiedown connections, of simple, light weight, strong and sturdy construction, which can be readily engaged with or be released from the tiedown track and which will lock in place on engagement in the track, and which will hold securely under all conditions.

FIG. 1 in the accompanying drawings, illustrating practical embodiments of the invention, is a plan view of one of the end fittings, engaged in a section of track, with broken lines indicating how the fitting may be made in different lengths.

FIG. 2 is a broken end view showing one anchor plate seated in the track and the second, companion anchor plate, turned down at an angle to enter the track in back of the first engaged plate.

FIG. 3 is a similar view showing the second plate turned up in full back to back engagement with the first plate and in fully interlocked engagement with the track.

FIG. 4 is a front view of the fitting engaged in a track.

FIGS. 5 and 6 are front and end views respectively, of a modified form of fitting, with finger clip to hold the parts in engaged back-to-back relation and with a tiedown ring in place of the web connection first shown.

FIGS. 7 and 8 are detail views of further modifications.

FIGS. 9 and 10 are plan and face views of a modified form, and FIG. 11 is a sectional view on line 11—11 of FIG. 10.

FIG. 12 is an edge view.

The tiedown track 10, illustrated, is of generally usual construction, having opposed side flanges 11 spaced to provide a relatively narrow entrance slot 12, and beneath or in back of said flanges, a widened channel 13, in effect an inverted T-form channel.

The slot defining flanges 11 have opposed circular notches 14, spaced to leave the projections 15 between adjoining pairs of notches.

The end fitting is in two parts in the form of companion plates 16, 17, which may be duplicate sheet metal plates, stamped or formed with angularly projecting bottom flanges 18, to extend beneath the projections 15 of the track flanges and side flanges 19, which may be extensions of the bottom flanges 18, to engage the sides of the projections 15.

These two anchor plates with the bottom and side flanges described, are proportioned, in the back-to-back relation shown in FIGS. 1 and 3 to substantially fill the narrow entrance slot and to fully engage beneath the projecting portions 15 of the track flanges.

Confined in this back-to-back relation, the plates are anchored against release movement in any direction.

To the contrary, when the plates are separated, as shown in FIG. 2, one plate 16 may be located in upright holding position in the track and the companion plate 17, separated from the first plate, be rocked from an angular position entered at the lower end of the plate, to an upright position, FIG. 3, where it backs up the first plate and thus locks the both plates fully engaged in the track.

This method of attachment requires that the tiedown connection to which the fitting is applied, must allow sufficient free motion for engagement of the plates in the track and must, when loaded, apply a pull which will hold the plates firmly engaged in the back-to-back holding position.

For such purposes, the plates may be perforated as shown at 20, for a loop of webbing 21, binding the two plates loosely together and of sufficient extent as shown in FIG. 2, to permit the plates being separated and angularly related to engage them beneath the track flanges.

As shown in FIG. 3, the load on the web loop 21 will pull the anchor plates together and hold them in that position, locked to the track against any pull out or longitudinal movement of the fitting in the track.

If desired, a sliding loop 22 may be engaged about the web loop 21 to secure the latter in position holding the plates in back-to-back relation locked to the track.

The locking or securing loop 22, may be particularly desirable for holding the plates locked to the track when load on the web is released.

Other forms of holding devices may be provided, such as a clip 23, pivoted at 24, on one of the plates 17 and designed to be turned down into engagement over the other plate 16.

FIGS. 7 and 8 show how one plate 16 may have a keyhole slot 25 in which, with slight relative movement of the plates, a headed pin 26 on the other plate 17 may be engaged; FIG. 7 illustrating this pin as spring pressed at 27.

While advantageously adapted to use with cargo tiedown web, many other forms of tiedown connections or connectors may be used, such as the cargo tiedown rings or shackles, shown at 28 in FIGS. 5 and 6 and which while confining the anchor plates to the back-to-back locked condition under load, will allow sufficient freedom for the engagement or release of one plate in respect to the other.

The tracks or fixed anchorages may be of any length and may have closed or open ends, as illustrated in FIG. 1.

FIG. 1 is also referred to as showing in dotted lines, at 29, how the plates may be extended to interlock with two or more pairs of the flange projections 15.

The form of the invention shown in FIGS. 9, 10 and 11 differs from that first shown in that the interlock between the plates and track is effected by embossments 30 in the mid-portions of the plates disposed to enter the notches 14 in the track flanges, instead of the side flanges, 19, disposed to engage opposite sides of the projections 15.

These embossed projections 30 have the advantage of stiffening the mid-portions of the plates, carrying the bottom flanges 31 which engage beneath the track flanges.

This construction permits of the bottom holding flange 31 being practically the full length of the fixture; thus to gain a longer hold on the track flange.

This bottom flange may be further reinforced by integral inclined gusset portions 32 extended from the ends of the plates into the ends of the flanges.

What is claimed is:

1. An end fitting for cargo tiedown gear comprising a pair of anchor plates having flanges at the bottom to engage beneath opposed flange projections on a cargo tiedown track and side flanges at opposite ends of said bottom flanges to engage the sides of said track projections, said plates engaging in back-to-back relation to effect said engagement of said bottom and side flanges with said projecting portions of the track flanges, and cargo tiedown connection means loosely connecting said plates in said back-to-back relation with freedom for relative movement of the plates to effect said interlocked engagement with the track projections and said cargo tiedown connection arranged under load to hold the two plates in said back-to-back relation interlocked with said track flanges as described.

2. The invention according to claim 1 with said tiedown connection means including a loop of flexible material extending through the upper portions of said anchor plates and of sufficient extent to permit separation of said plates and to draw the plates together in the back-to-back relation described.

3. The invention according to claim 2 with a confining loop surrounding said loop of connecting material and slidable thereover to effect the closing of said connecting loop into gripping engagement with said anchor plates.

4. The invention according to claim 1 with manually releasable means for gripping and holding said anchor plates in the back-to-back relation described.

5. The invention according to claim 1 in combination with cargo tiedown track means having opposed flanges forming an undercut inverted T-shaped channel of a width to receive and hold said plates in the back-to-back relation described and with said flanges having oppositely disposed pairs of notches forming projections between adjoining pairs of notches of a width slightly less than the distance between said side flanges of the plates whereby to enter between said side flanges and hold said plates against longitudinal movement in said track means.

6. An end fitting for cargo tiedown gear comprising a pair of anchor plates having flanges at the bottom to engage beneath opposed flange projections on a cargo tiedown track and means to engage with said track projections to interlock said plates against longitudinal movement in said track, said plates engaging in back-to-back relation to effect said interlocking engagement of the plates with the track, and cargo tiedown connection means loosely connecting said plates in said back-to-back relation with freedom for relative movement of the plates to effect said interlocked engagement with the track projections and said cargo tiedown connection arranged under load to hold the two plates in said back-to-back relation interlocked with said track flanges as described, said interlocking means being in the form of projecting embossments on said plates above said bottom flanges and supporting and reinforcing gussets connecting the ends of said plate flanges with the body portions of the plates above said flanges.

References Cited

UNITED STATES PATENTS

| | | | |
|---|---|---|---|
| 2,735,377 | 2/1956 | Elsner | 105—369 A |
| 2,845,680 | 8/1958 | Elsner | 24—265 |
| 2,984,885 | 5/1961 | Elsner | 24—265 |
| 3,263,629 | 8/1966 | Higuchi | 105—369 A |
| 3,363,292 | 1/1968 | Reiter | 24—265.1 |

CHANCELLOR E. HARRIS, *Primary Examiner.*

J. PETO, *Assistant Examiner.*

U.S. Cl. X.R.

248—361; 105—369